April 7, 1964  O. A. ITRIA  3,127,950

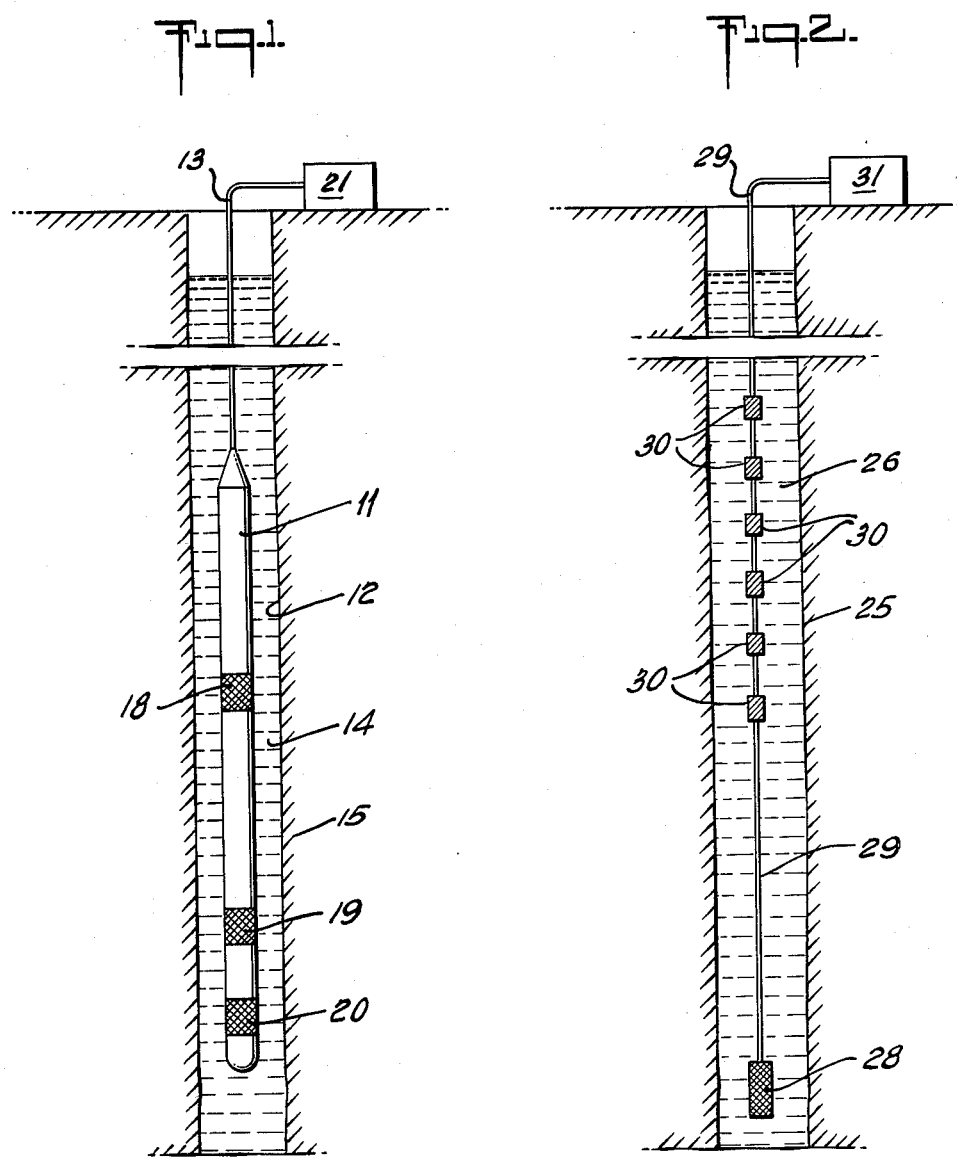

METHOD OF DETERMINING SHEAR WAVE VELOCITIES

Filed Dec. 3, 1959  2 Sheets-Sheet 2

United States Patent Office 3,127,950
Patented Apr. 7, 1964

3,127,950
METHOD OF DETERMINING SHEAR
WAVE VELOCITIES
Oswald A. Itria, Bellaire, Tex., assignor to Texaco Inc.,
New York, N.Y., a corporation of Delaware
Filed Dec. 3, 1959, Ser. No. 856,965
8 Claims. (Cl. 181—.5)

This invention is concerned with bore hole logging in general. More specifically, the invention deals with a novel method for determining shear wave velocities of the formations penetrated by a bore hole. Such shear waves are seismic in nature, and the velocity thereof provides a basis for determining a number of different elastic constants of the formation. Therefore, by finding the shear wave velocities along the length of a bore hole, these elastic constants may be determined and such data logged, as related to that bore hole.

Heretofore, well log data has had its limitations in the kind, and amount of information that is obtainable therefrom. For example, there are certain elastic constants of the material that make up such formations, which constants require shear wave velocity data for determining values for the constants. To be able to determine such elastic constants will be of great benefit in evaluating or determining the exact properties and nature of any given subterranean formation. Such more accurate information concerning the subterranean formations will be a source of great improvement in the evaluation of such formations, as to whether or not there is an economically feasible amount of recoverable petroleum products.

Some of the elastic constants that are thus valuable to be able to determine for a given subterranean formation as it exists in place underground, include among others: the modulus of rigidity, Young's modulus, and the bulk modulus. In order to determine any of these moduli, it is important to have the value of Poisson's ratio. Poisson's ratio itself is a pure number and involves an expression that includes values for the longitudinal seismic velocity, and in addition the shear seismic velocity of the formation under consideration. Thus, one expression for Poisson's ratio is in accordance with the following equation:

$$\mu = \frac{\frac{1}{2}\left(\frac{V_p}{V_s}\right)^2 - 1}{\left(\frac{V_p}{V_s}\right)^2 - 1} \quad (1)$$

Where, $\mu$ stands for Poisson's ratio, $V_p$ stands for longitudinal velocity and $V_s$ stands for shear velocity.

Determination of values for the longitudinal wave velocity in subterranean formations, is relatively easy by use of known techniques with use of so-called "velocity" logging tools. However, heretofore shear wave velocities for subterranean formations have not been obtainable. Now, however, by carrying out a method in accordance with this invention, the shear wave velocity for a subterranean formation may be determined, and consequently the value of Poisson's ration may then be calculated in connection with any given formation, by the use of the longitudinal wave velocity for the same formation. Thereafter, it becomes merely a matter of substitution of values, and calculation of the equations, to determine values for the elastic constants in connection with the subterranean formation being considered. In this manner the properties thereof may be completely evaluated. Thus, it will be noted that the shear wave seismic velocity for a given subterranean formation is the key to determining the various elastic constants desired.

Consequently, it is an object of this invention to provide a method for determining the shear wave velocity of a subterranean formation, so that the desired elastic constants thereof may become available.

It is a further object of this invention to teach a method for determining shear wave velocity at predetermined locations along a bore hole. Such method includes the measuring of necessary characteristics of the formation, and of the fluid in the bore hole, including in such measurements the determination of the tube wave velocities in such bore hole.

Briefly, the invention concerns a method of determining shear wave velocities at predetermined locations along a bore hole. The method comprises the steps of measuring the density of the fluid in said bore hole, and measuring the formation density at said predetermined location. The method also comprises the steps of measuring the longitudinal wave velocity of the fluid in said bore hole, and measuring the tube wave velocity in said bore hole at said predetermined location, whereby the shear wave velocity may be calculated for the formation at said predetermined location so long as the wave length of the tube wave is long compared to the diameter of the bore hole.

The foregoing and other objects and benefits of the invention will be more fully appreciated, in connection with a more detailed description of the invention which follows, and which is illustrated in the drawings, in which:

FIG. 1 is a schematic diagram illustrating one type of equipment that may be used to measure the tube wave velocity in a bore hole;

FIG. 2 is another schematic diagram illustrating different apparatus that may be employed to measure tube wave velocities in a bore hole, by another procedure;

Figure 3:
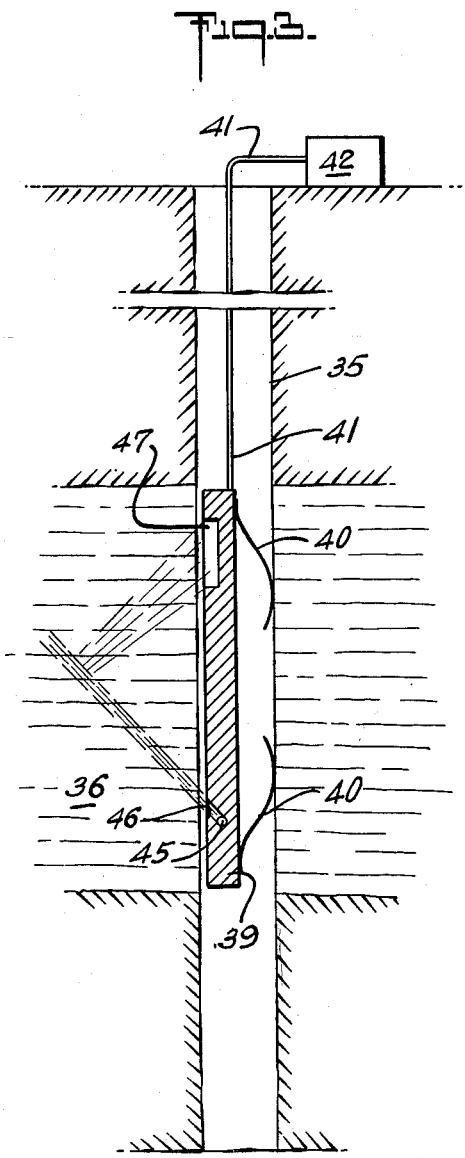
FIG. 3 is a schematic diagram illustrating one method of measuring the density of the formations surrounding a bore hole.

In connection with petroleum production, it is important to determine as much information as possible concerning the nature of the subterranean formations that are penetrated, whenever a bore hole is drilled. In this regard, many different types of well logging operations are carried out today, and even so there are properties of the formations that are not clearly defined. Some of the properties that have not heretofore been accurately determinable, are the modulus of rigidity of the formation, Young's modulus, and the bulk modulus of the formation.

All three of the foregoing moduli are mathematically related to the value of Poisson's ratio. However, Poisson's ratio has not been heretofore feasibly determinable for subterranean formations, because the ratio depends upon both longitudinal velocity and shear velocity of seismic wave travel through the formation. Determination of the longitudinal velocity of seismic wave travel through subterranean formations has been feasible with velocity loggers for some time. But, the companion determination of shear wave velocities for subterranean formations has not been determinable heretofore. Probably one reason that this is so, is that shear wave energy is at best difficult to identify and measure and it is not feasibly measurable for subterranean formations. However, it has been discovered that the shear wave velocity for a given formation is directly dependent upon the tube wave velocity for the formation that makes up the walls of a bore hole. This is in accordance with the equation, that may be expressed as follows:

$$V_s = \left(\frac{\rho_0}{\rho}\right)^{1/2} \cdot \frac{C}{\left[1-\left(\frac{C}{V_f}\right)^2\right]^{1/2}} \quad (2)$$

In this expression $V_s$ represents the shear wave velocity, C represents the tube wave velocity, $V_f$ represents the bore hole fluid velocity, $\rho_0$ represents the density of the fluid in the bore hole, and $\rho$ represents the density of the formation surrounding the bore hole.

The expression of Equation 2 holds true so long as the wave length of the tube wave is large compared to the diameter of the bore hole. Such limiting condition for the validity of the equation, is readily obtained since the tube wave generation of such wave length is readily provided with the normal frequency range of seismic energy. The steps of the method for determining the shear wave velocities, have been indicated by the foregoing and may be enumerated as follows below. It will be clear that the order of carrying out the steps may be altered in various ways without changing the method.

A first step is that of measuring the density of the fluid in the bore hole, at the location (depth) of interest. Such density measurement is old and well known per se and may be carried out readily by anyone skilled in the art. It may be noted that the density of any fluid is defined as the mass per unit volume thereof. This measurement may therefore be readily carried out by sampling the fluid in the bore hole, and then by providing a correction as required for the particular depth in the bore hole that is of interest for a given shear wave velocity determination.

A second step is that of measuring the formation density at the particular depth of interest in the bore hole that penetrates the formation. This second step may be carried out in at least two different ways, one of which is the use of the results taken from a scattered gamma ray log of the bore hole. This manner of carrying out the second step is described in more detail below, in connection with FIGURES 3 and 4 of the drawings. However, it may be described briefly here, as follows: The readings or recorded information from a scattered gamma log are directly translatable into density of the formation by well known relationships which are found in accordance with the direct ratio that may be set up between the density of the formation and the amount of scattering of the gamma rays therein.

Another manner of measuring the formation density along the bore hole, is that of maintaining a log, or record of the cuttings that are received from the bore hole as it is drilled so that the cuttings themselves may be used for directly measuring by physical means the density of the formations that are drilled out.

Another step of the method is that of measuring the longitudinal seismic wave velocity of the fluid in the bore hole. This measurement is readily carried out by known techniques. For example, a seismic wave transmitter is located spaced from a seismic wave detector, a known distance apart in the bore hole fluid. Then, the time for a given seismic pulse to travel from the transmitter to the detector, is measured and the velocity calculated. It may also be estimated for various bore hole fluids, to a very close degree of accuracy.

Finally another step that is involved (in the determination of shear wave velocities at a given location) is the step of measuring the tube wave velocity in the bore hole at such location. This step is not necessarily as familiar and well known per se, as the foregoing steps; and two types of apparatus for carrying out this tube wave measuring step are illustrated in the drawings.

Referring to FIG. 1 it is pointed out that the tube wave velocity measurements in a bore hole may be carried out using a seismic wave logging tool 11, that is lowered into a bore hole 12 to a predetermined depth therein, by means of a cable 13 that supports the tool 11 and also carries the electrical circuit connection wires therein. The bore hole 12 will be filled with a fluid 14; and the bore hole penetrates a series of subterranean formations 15, the properties of which it is desired to investigate.

The logging tool 11 includes a seismic wave energy transmitter 18 that is spaced a considerable distance from one or more receiving elements 19 and 20. At the surface of the ground there is a recorder 21, which includes the necessary elements for controlling the generation of seismic wave energies by the transmitter 18, in addition to the receiving and recording of the energies as they arrive at the receivers 19 and 20. It is pointed out that velocity logging tools are well known, e.g. see U.S. Patents 2,207,281, to Athy et al.; 2,233,992, to Wyckoff; and 2,238,991, to Cloud; and the basic elements involved in the particular logging tool 11 that is to be employed, are substantially the same as the elements of a standard velocity logging tool. The only difference involved in tool 11 over a standard velocity logging tool, is the longitudinal dimensions of the tool; since the distance between transmitter 18 and the nearest receiver 19 must be on the order of considerably more than ten feet. In contrast, the standard logging tool employs something less than ten feet.

The only other modification for the logging tool 11 and its recording equipment 21, is involved in the requirements for recognizing a tube wave as distinguished from an ordinary seismic longitudinal wave. The characteristics for thus recognizing a tube wave will be more fully discussed below, but it is sufficient to note here that the tube wave travels more slowly than the longitudinal wave and in addition must travel at a slower velocity than the velocity of a longitudinal wave traveling through the bore hole fluid 14.

The electronic circuit arrangement (not shown) of the recorder and control elements 21 will be arranged to provide for a continuous logging operation, and this includes a periodic seismic pulse transmitted by the transmitter 18 followed by a time delay with a gating circuit arrangement so that the energy picked up at receivers 19 and 20 will not be recorded until some time following the first energy arrivals. This is because the first energy arrivals are the longitudinal waves which have travelled through the adjacent formations 15, and these would only serve to add unwanted signals. Consequently, the tube wave energy arrivals will stand out more readily as recognizable seismic wave arrivals.

Of course, the depth of the logging tool 11 in the bore hole will be kept track of by noting the length of cable 13 that is payed out as the tool descends in the hole. Then, the tube wave velocity data may be directly related to a given depth within the bore hole 12, so that the tube wave velocity is thus that of the formation 15 at such predetermined location along the wall of the bore hole 12.

FIG. 2 illustrates another arrangement for carrying out the steps of measuring the tube wave velocity of a bore hole. In FIG. 2 there is diagrammatically illustrated a bore hole 25 that has fluid 26 therein. In this manner of carrying out the velocity measuring step for a tube wave velocity, there is a source of seismic wave energies 28 that is attached at the lower end of a cable 29 which extends up to the surface and has attached thereto, in addition, a group of seismic wave detectors 30. The cable 29 extends on up the hole to the surface and is connected to a recording and control unit 31. Similarly as with the FIG. 1 arrangement, the cable 29 must have sufficient strength to be able to support the seismic wave generator 28 plus the detectors 30 in a relatively deep bore hole. The cable 29 will also include electrical connectors for carrying the electrical signals to and from the seismic wave generator 28 and each of the detectors 30 respectively.

The procedure for carrying out tube wave velocity measurements with the FIG. 2 arrangement, involves making a series of records at the recording unit 31. These record the seismic wave energy received by the detectors 30 following a generation of seismic energy at the source unit 28. It will be understood by those skilled in the art that the source of seismic energy 28 may take various forms. However, it is preferably an explosive unit for providing seismic energy waves in a short time duration, high intensity manner, by the detonation of an explosive charge. Of course, the arrangement is in addition, preferably one which allows a plurality of individually fired charges to be detonated at the unit 28, so that a substantial number of records may be made successively without raising the entire group of instruments (detectors 30 and unit 28) to the surface after each charge firing.

In order to make the recording over a given length of the bore hole 25, a series of records will be taken with the detectors 30 located successively in a continuous manner over the length of bore hole being surveyed or logged. Thus, for example, starting with the bottom of a bore hole 25, the first record would be made with unit 28 substantially resting on the bottom of the hole. After this record has been made the cable 29 is reeled up until the lowermost detector 30 occupies the location that was previously occupied by the uppermost detector 30 of the first record spread, and then another record is made by detonating a second charge at the unit 28. This procedure will be continued all the way up the bore hole 25 for as far along the hole as it is desired to make a survey and determine the velocity of the tube waves therein.

It will be appreciated that the seismic wave source 28 might be located above the detectors 30 instead of below as illustrated. In such case the only difference would be that the seismic energies received at the detectors would be traveling down along the bore hole instead of up.

It will be clear to anyone skilled in the art that the tube waves may be recognized on the records as made from each detonation, or other type output of seismic wave energies at unit 28, upon arrival at the detectors 30. Such recognition is made by the characteristics of the tube wave itself. The three main characteristics by which the tube wave may be recognized are (1) the amplitude ordinarily much stronger than either a longitudinal seismic wave (usually referred to as the "P" wave) or any of the other types of seismic wave energies. (2) The tube wave is known to travel with a much lower velocity than a longitudinal, or "P" wave. (3) The tube wave must travel with a velocity that is less than the velocity of the fluid within the bore hole.

The records may include an indication of the instant that the seismic energy is transmitted from the unit 28. Such arrangements are well known for the case where an explosive charge is employed. Thus, an explosive detonation may be carried out with an electric cap detonator, or with a gun perforator, either one being employed in a circuit that will provide a sharp break or kick on the record, indicating the instant when detonation occurs.

As already indicated above, the scattered gamma ray log method of determining formation density is a well known method of logging bore holes. However, it is briefly described here with illustrations, in connection with FIGS. 3 and 4. In FIG. 3 there is illustrated, schematically in a bore hole 35 that penetrates formations including a formation 36, the density of which it is desired to determine. Such determination may be made by lowering into the bore hole 35 a logging tool 39 that usually has some type of spring bias structure, such as a pair of springs 40 to hold the logging tool 39 against one side wall of the bore hole 35. The tool 39 is lowered into the bore hole by means of a cable 41 that is connected to surface located recording equipment 42, at the upper end thereof. In the tool 39 there is a source of gamma ray radiation 45 that is situated with an angularly directed opening, or window 46 to provide a narrow beam of gamma rays directed upwardly into the formation 36. Spaced above the location of gamma ray source 45 there is a gamma ray sensitive detecting unit 47, which is in the nature of a radiation intensity counter e.g. a Geiger counter for measuring the radiation intensity at this point.

It will be observed that the intensity of radiation received at detector 47 is dependent upon the amount of scattering of the ray that was emitted from source 45 through the window 46. Furthermore, such scattering has been determined to be directly dependent upon the density of the formation such as formation 36, and consequently the radiation intensity count at detector 47 is a direct indication of the density of formation 36.

Figure 4:
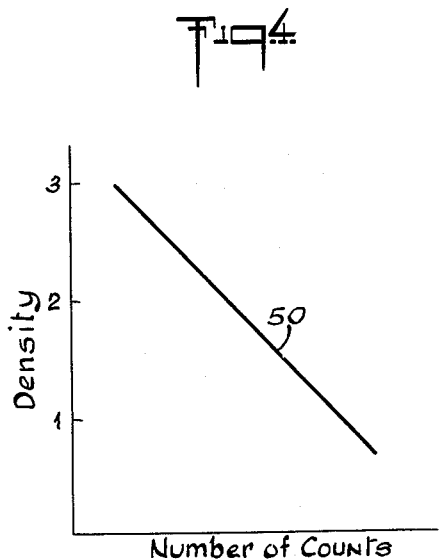
FIG. 4 is a graph showing the relationship of the density to the number of counts, for translating the record of the logging tool of the FIG. 3 illustration to density measurements.

The latter relationship is illustrated in FIG. 4 where there is shown a straight line relation or curve 50 that is the result of plotting formation density as the ordinate, against the number of counts at the abscissa. It being understood of course that the number of counts represents the output of counter or detector 47, which indicates the radiation intensity at any given time. It may be noted that the linear relationship between density and the number of counts of the radiation detector as recorded by the surface recorder 42, may be calibrated for different known formation materials, so that the results may be directly translated by means of such calibration to provide the formation density information desired.

Having carried out the method according to this invention, and thus having determined the shear velocity for a given formation along a bore hole; the various constants for the formation material may be calculated in accordance with known formulas or equations, e.g. the formulas provided by a publication entitled "Earth Waves," by L. Don Leet, at pages 38 through 46. This publication is from Harvard Monographs in Applied Science and is No. 2 thereof. Similarly, equations for determining elastic constants of a formation are provided by J. J. Jakosky in his book entitled Exploration Geophysics (second edition) at page 658 thereof.

It will be observed that in any case the equations that are provided for determining the elastic constants of a formation include among the terms thereof Poisson's ratio. Now as indicated above, Poisson's ratio may be determined from the equation:

$$\mu = \frac{\frac{1}{2}\left(\frac{V_p}{V_s}\right)^2 - 1}{\left(\frac{V_p}{V_s}\right)^2 - 1} \tag{1}$$

(Terms defined above.)

Therefore it is merely necessary (following the carrying out of the steps of this invention) to substitute in the Poisson's ratio Equation 1 the values determined for the longitudinal velocity of the formation, and similarly those determined by this method for the shear velocity of the formation; and then the ratio (by solving the equation for $\mu$) will be Poisson's ratio in the form of a pure number.

It may be noted that while many of the individual steps involved in the method according to this invention, may have been already known, per se, in one form or another; the applicant believes that he has invented a new and meritorious method for determining seismic shear velocities in subterranean formations that comprises the steps as described above. It will be readily appreciated that the more information that may be had concerning the subterranean formations along a bore hole, the better are the chances of accurately determining the possibility concerning recovery of the petroleum products, or other valuable minerals, therefrom.

While a preferred embodiment of the invention has been described above in considerable detail in accordance with the applicable statutes, this is not to be taken

What is claimed as the invention is:

1. A method of determining shear wave velocities at predetermined locations along a bore hole, comprising the steps of measuring the density of the fluid in said bore hole, measuring the formation density at said predetermined locations, measuring the longitudinal wave velocity of the fluid in said bore hole, measuring the tube wave velocity in said bore hole at said predetermined locations, and computing the shear wave velocity from said measurements.

2. A method of determining shear wave velocities at predetermined locations along a bore hole, comprising the steps of measuring the density of the fluid in said bore hole, measuring the formation density at said predetermined locations, measuring the longitudinal wave velocity of the fluid in said bore hole, measuring the tube wave velocity in said bore hole at said predetermined locations, and computing the shear wave velocity at said predetermined locations in accordance with the equation:

$$V_s = \left(\frac{\rho_0}{\rho}\right)^{1/2} \cdot \frac{C}{\left[1-\left(\frac{C}{V_f}\right)^2\right]^{1/2}}$$

wherein $V_s$ is the shear wave velocity, $C$ is the tube wave velocity measured in the bore hole, $\rho_0$ is the density of the fluid in the bore hole and $\rho$ is the density of the formation, and $V_f$ is the longitudinal wave velocity of the fluid in the bore hole.

3. A method of determining shear wave velocities at predetermined locations along a bore hole, comprising the steps of measuring the density of the fluid in said bore hole, measuring the formation density at said predetermined location, measuring the longitudinal wave velocity of the fluid in said bore hole, measuring the tube wave velocity in said bore hole by lowering therein a seismic wave logging tool having a seismic wave energy transmitter therein, and a plurality of seismic energy receiving elements all spaced more than ten feet from said transmitting element, periodically transmitting seismic energies from said transmitter followed by receiving and recording said energies at said receivers with a time interval sufficient to ensure the receipt of unobstructed tube wave energies, and determining the time interval of said tube wave reception between at least two of said receivers in order to measure the said tube wave velocity, and computing the shear wave velocities from said measurements.

4. A method of determining shear wave velocities at predetermined locations along a bore hole, comprising the steps of measuring the density of the fluid in said bore hole, measuring the formation density at said predetermined location, measuring the longitudinal wave velocity of the fluid in said bore hole, measuring the tube wave velocity in said bore hole by lowering therein a seismic wave energy source in addition to a plurality of spaced seismic wave detectors, generating a pulse of seismic wave energies at said transmitter and receiving seismic wave energies as detected by said detectors with a timing of the intervals between said transmission and said receipt of energies at the detectors, and recording said detected energies in order to determine the time intervals between transmission of said seismic wave energies and receipt of a tube wave seismic energy arrival at said detectors, and computing the shear wave velocities for a given formation along said bore hole from said measurements.

5. A method of determining shear wave velocities at predetermined locations along a bore hole, comprising the steps of measuring the density of the fluid in said bore hole, measuring the formation density at said predetermined locations by running a scattered gamma ray log along said formations, measuring the longitudinal wave velocity of the fluid in said bore hole, measuring the tube wave velocity in said bore hole by running a seismic velocity logging tool with more than standard spacing between transmitter and a receiver thereon for measuring tube wave velocities, and computing shear wave velocities from said measurements.

6. A method of determining shear wave velocities at predetermined locations along a bore hole, comprising the steps of measuring the density of the fluid in said bore hole, measuring the formation density at said predetermined locations by running a scattered gamma ray log determination along said formations, measuring the longitudinal wave velocity of the fluid in said bore hole, measuring the tube wave velocity in said bore hole by running a seismic wave velocity traverse along said bore hole to record seismic wave arrivals and determine tube wave velocities at said formations, and computing shear wave velocities from said measurements.

7. A method of determining shear wave velocities at predetermined locations along a bore hole, comprising the steps of measuring the density of the fluid in said bore hole, measuring the formation density at said predetermined locations, measuring the longitudinal wave velocity of the fluid in said bore hole, measuring the tube wave velocity in said bore hole by running a seismic velocity logging tool having sufficient spacing of the elements thereon to provide for measurement of said tube wave velocities at said predetermined locations, and computing the shear wave velocity at said predetermined locations in accordance with the equation:

$$V_s = \left(\frac{\rho_0}{\rho}\right)^{1/2} \cdot \frac{C}{\left[1-\left(\frac{C}{V_f}\right)^2\right]^{1/2}}$$

wherein $V_s$ is the shear wave velocity, $C$ is the tube wave velocity measured in the bore hole, $\rho_0$ is the density of the fluid in the bore hole, $\rho$ is the density of the formation, and $V_f$ is the longitudinal wave velocity of the fluid in the bore hole.

8. A method of determining shear wave velocities at predetermined locations along a bore hole, comprising the steps of measuring the density of the fluid in said bore hole, measuring the formation density at said predetermined locations, measuring the longitudinal wave velocity of the fluid in said bore hole, measuring the tube wave velocity in said bore hole by running a seismic wave traverse along said bore hole employing a source of seismic wave energy and a plurality of detectors spaced therefrom all connected to a recorder for making a record of the received wave energies so as to determine said tube wave velocity at said predetermined locations, and computing the shear wave velocities at said predetermined location in accordance with the equation:

$$V_s = \left(\frac{\rho_0}{\rho}\right)^{1/2} \cdot \frac{C}{\left[1-\left(\frac{C}{V_f}\right)^2\right]^{1/2}}$$

wherein $V_s$ is the shear wave velocity, $C$ is the tube wave velocity measured in the bore hole, $\rho_0$ is the density of the fluid in the bore hole, $\rho$ is the density of the formation, and $V_f$ is the longitudinal wave velocity of the fluid in the bore hole.

References Cited in the file of this patent

UNITED STATES PATENTS

| | | |
|---|---|---|
| 2,207,281 | Athy et al. | July 9, 1940 |
| 2,233,992 | Wyckoff | Mar. 4, 1941 |
| 2,238,991 | Cloud | Apr. 22, 1941 |
| 2,493,346 | Herzog | Jan. 3, 1950 |
| 2,771,960 | Smith | Nov. 27, 1956 |
| 2,784,796 | Overton | Mar. 12, 1957 |
| 2,813,590 | McDonald | Nov. 19, 1957 |